Patented July 15, 1924.

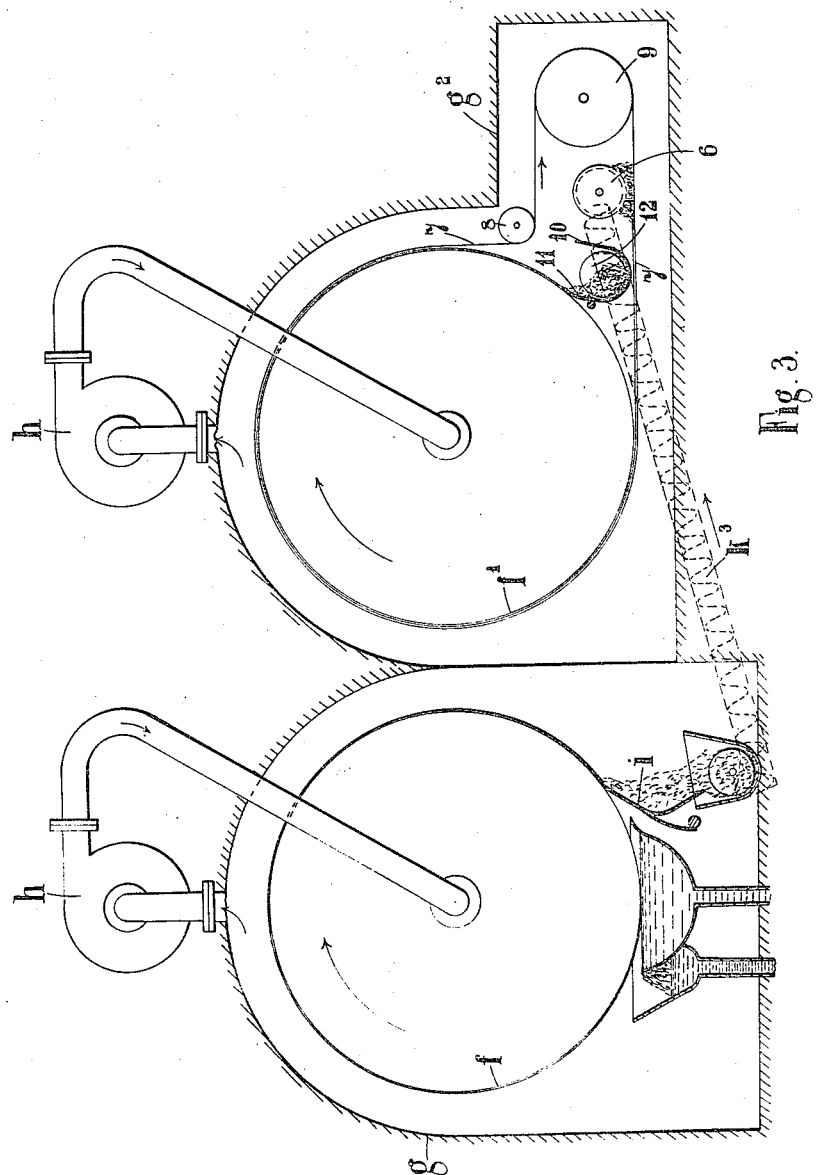

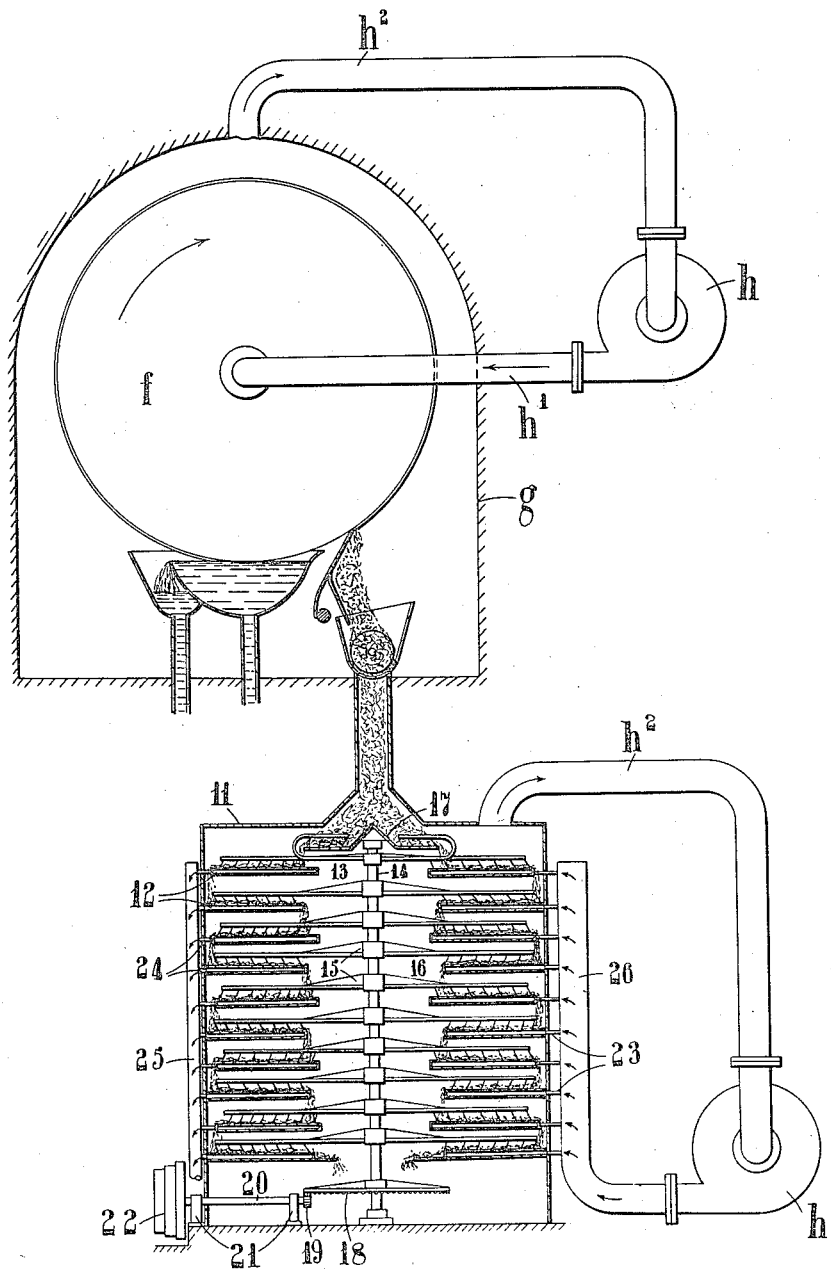

1,501,513

UNITED STATES PATENT OFFICE.

TEOFRON BOBERG, OF CLAPHAM PARK, LONDON, ENGLAND, ASSIGNOR TO TECHNO-CHEMICAL LABORATORIES LIMITED, OF LONDON, ENGLAND.

DRYING PROCESS AND APPARATUS THEREFOR.

Application filed February 12, 1920. Serial No. 358,088.

*To all whom it may concern:*

Be it known that I, TEOFRON BOBERG, a subject of the King of Great Britain and Ireland, and residing at "Fairlawn", Clarence Road, Clapham Park, London, S. W. 4, England, have invented certain new and useful Improvements in or Relating to Drying Processes and Apparatus Therefor, of which the following is a specification.

This invention relates to methods of drying by evaporation of the type in which the matter is continually applied to a heat transmitting surface in the form of a thin film which is constantly replaced by further applications.

In American patent specifications Nos. 1,150,713 and 1,200,996 in the names of O. Soderland and T. Boberg, there is described a method of evaporation in which the vapour given off by the liquid after being compressed to raise its temperature a few degrees, is returned again as heating medium to the opposite side of the evaporating surface over which the material to be evaporated is constantly circulated as a thin moving film of liquid.

In evaporative drying by surfaces upon which the matter is spread, say for example, by the employment of a rotating drum surface containing the heating medium, and upon the exterior of which the matter to be evaporated is applied, it has always been considered necessary to maintain a considerable temperature difference between the material to be dried and the heating medium in order to obtain a rapid heat flow through the evaporating surface and thus effect the necessary degree of drying within the comparatively short period that the material can remain upon a surface of a reasonable size from the time of application to the time of removal, and it was believed that the resistance to heat transmission greatly increased as the film securing contact with the evaporating surface diminished and disappeared.

Further the adhesion of solid matter to a heat transmitting surface has been considered objectionable, as it is believed to obstruct the passage of heat therethrough, and when evaporating liquids which have a tendency to become "thick" at higher concentrations, it has been proposed to provide scrapers which throughout the evaporating operation constantly disturb the material on the heating surface in order to keep it clean.

We have, however, found that given the necessary conditions drying can be effected upon an evaporating surface with only a few degrees difference between the temperature of evaporation and the temperature of the heating medium.

The object of the present invention is to apply the evaporating methods indicated in the specifications of the above-mentioned American patents to evaporative drying.

The invention consists in a method of obtaining solids by evaporative drying, according to which material such as a solution or suspension of a solid in a liquid is thinly distributed upon a heating surface to which the drying material more or less adheres during its treatment, and the vapour given off during the drying process, after having its temperature raised a small amount by compression, is utilized as the medium for heating said surface.

The invention further consists in apparatus for operating in accordance with the method set forth in the preceding paragraph, in which the material is continuously distributed upon a heated plate or like surface within a closed chamber, the vapour given off being returned after compression as the heat supplying medium, while the substance is not removed from said surface until it attains the desired dryness required in the treatment.

The invention further consists in applying the method of heating a drying surface by the vapour given off therefrom, after the temperature of the vapour has been raised a small amount by compression as above described to evaporative drying in two or more stages in order to reduce the size of apparatus required for a given output of dried material.

The invention further consists in a method of evaporative drying by means of a heated medium derived by the compression of the evolved vapour, according to which pulpy or like substance having a high water content is dried to a semi-solid or other condition of lower water content in apparatus of suitable dimensions and the resulting matter is then passed to one or more appliances of suitable capacity and construction in which the water content is further reduced to any desired amount.

The invention also consists in improvements in or relating to processes and/or apparatus for drying solid matter in combination or admixture with liquid as hereinafter described.

Referring now to the accompanying diagrammatic drawings:

Figure 3 shows another arrangement of two drums in which the material in the second stage will not of itself adhere to the drying surface.

Figure 4 shows an arrangement with a different type of apparatus for carrying out the second stage of the process.

Figure 1:
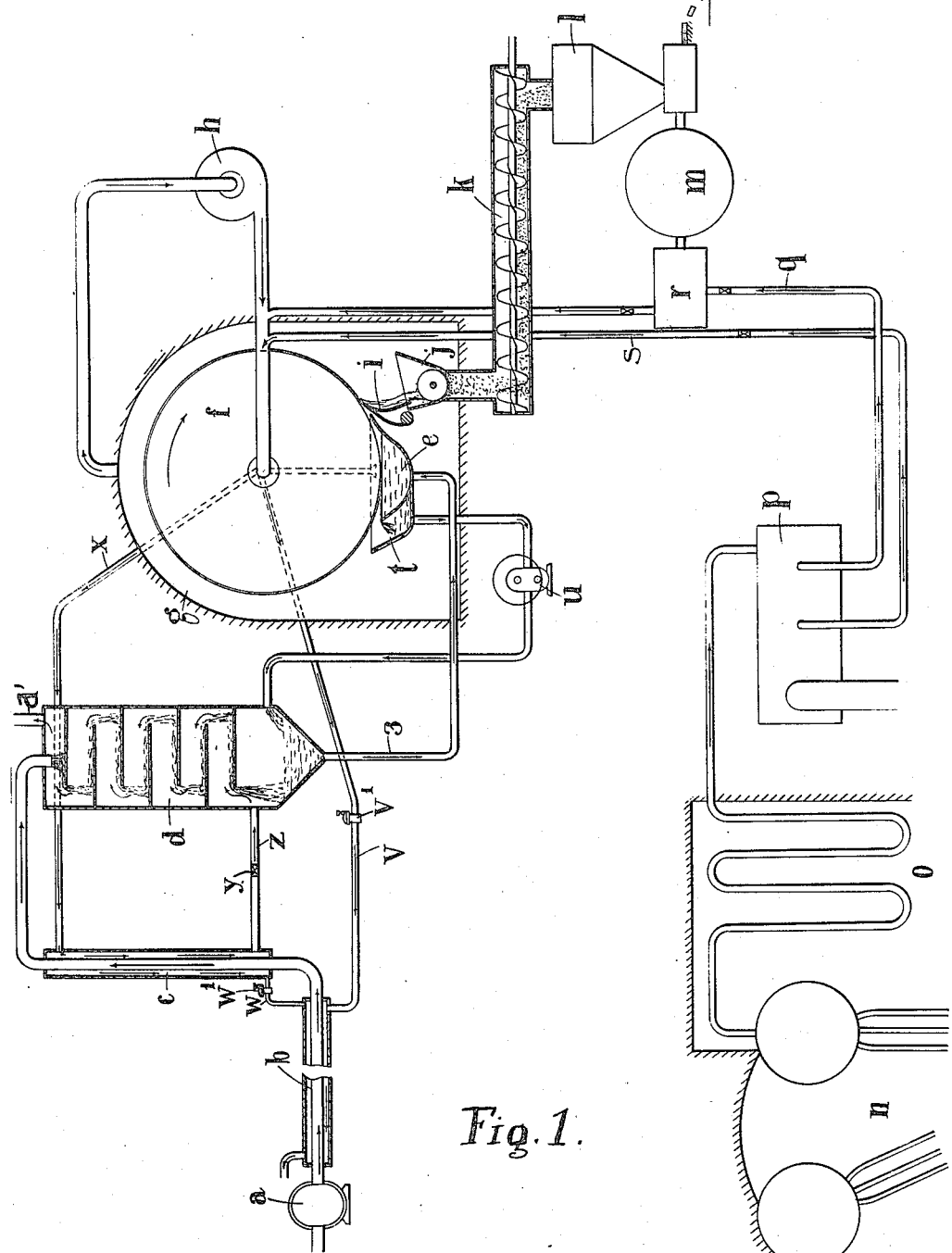
Figure 1 illustrates one convenient installation for carrying the invention into effect.

In accordance with this invention when operated in one convenient form, raw peat at ordinary temperature and having a water content in the neighborhood of 94% is delivered by a suitable pump $a$ through a surface contact heat interchanger $b$ heated by water and a surface contact heat interchanger $c$ heated by steam into a direct contact heater $d$ from which it passes to a trough $e$ by means of which it is applied to the surface of a drum $f$ rotating in a sealed casing $g$.

Within the casing $g$ and adjacent to the trough $e$ is a second overflow trough $t$ for collecting any pulp which may fall from the drum and for returning it together with a constant overflow from the trough $e$ by means of the pump $u$ into the direct contact heater $d$, thus by continuous circulation maintaining the pulp in the trough $e$ in a uniform condition.

Into the interior of the drum $f$ steam, say at a temperature of about 105° C. is delivered by a compressor $h$ which draws the steam evolved on the outer surface of the drum $f$ at about 100° C. from the casing $g$ and raises its temperature by the necessary small amount of, say 5° C. by compression.

Within the casing $g$ in contact with the downwardly moving side of the drum $f$ are scrapers $i$ which remove the more or less dried matter from the surface of the drum prior to its re-entering the trough $e$ and deliver it by means of a collecting hopper $j$ and conveyor $k$ to the hopper $l$ of a briquetting press $m$ or other desired location.

Power for the installation is conveniently derived from a boiler $n$ supplying steam say at 20 kilogrammes per square centimetre and 216° C. which is further heated in the superheater $o$ to a temperature of 360° C. and then passes to a turbine $p$ for supplying power to the installation, a connection $q$ controlled by the valve $q'$ from one stage of the turbine conveying steam at 10 kilogrammes per square centimetre and 266° C. to the cylinder $r$ of a briquetting press $m$, the exhaust from which at a temperature of 105° C. may also be carried to the drum $f$. A further supply pipe $s$ with valve $s'$ is also taken from a lower stage in the turbine to supply steam at 105° C. to the drum $f$ when required for starting, make up or other purposes, as indicated in the specifications before referred to.

The water of condensation from the drum $f$ passes by a connection $v$ and steam trap $v'$ to the hot water heater $b$ from which it is finally rejected at a temperature say in the neighbourhood of 20° C. after heating the raw peat. The condensed steam from the steam heater $c$ also passes by way of the connection $w$ and steam trap $w'$ to the water heater $b$.

Steam at 105° C. may be taken from the drum $f$ by means of a connection $x$ to the surface contact steam heater $c$, and some steam not condensed therein may, under control of the valve $y$, be returned through the connection $z$ and be utilized in the direct contact heater $d$ where in the absence of partitions necessarily retarding the heat transmission there need only be a small difference between the temperature to which the peat is raised and that of the heating medium, the peat may here be heated to about 100° C. or the temperature of evaporation before passing to the drum and may thus be substantially freed of air and fixed gases which may escape at the outlet $d'$ at a temperature of say 92° C. or very little above the temperature (say about 90° C.) of the entering peat. The heated peat passes by the connection 3 into the trough $e$.

A layer or film of the peat pulp is taken up by the surface of the drum $f$ as it moves through the pulp in the trough $e$ and said film remains closely adhering to the surface as the vapour is driven off and until the more or less dried solid matter is removed by the scrapers $i$.

The more or less dried peat entering the hopper $j$ may have any desired water content and may be delivered direct to a briquetting press by a conveyor $k$ as shown, or may be subjected to any other desired treatment.

It is to be understood that the appliances for carrying this invention into effect in the drying of peat as hereinbefore described are given by way of example only, and that the hereinbefore described method of obtaining solids by evaporative drying may be applied to the treatment of any solution or suspension of solids in liquids in any suitable vapour heated evaporating surface drier.

Suitable control or other means not necessarily indicated upon the diagrammatic drawing may be introduced as desired.

Where the material is of such a nature that owing to the weight of its particles it would not of itself adhere to the heating surface, some form of supporting screen having perforations or other provisions for the escape of the vapour, such for example as hereinafter described may be provided at any part of the surface from which the material might tend to become undesirably detached. Further such means may be employed for applying the material to a heating surface or for pressing it thereon in order to effect any desired degree of contact.

In carrying the invention into effect in the apparatus shown diagrammatically in Figure 2, say again for example, as applied to the treatment of peat, raw peat pulp having a water content say of 94% and heated by any convenient type of regenerative heat interchange appliances to substantially the temperature of evaporation, say about 100° C. is fed by a conduit $e'$ into a trough $e$ situated within an enclosed casing or chamber $g$.

Within the chamber $g$ is a rotatable drying drum $f$, a portion of the lower circumferential surface of which dips into the pulp in the trough $e$, a second trough $t$ being also provided to accommodate any overflow from the trough $e$ and for circulation as hereinbefore described.

The drum $f$ is heated by the vapour given off from the material which is being dried upon the surface of the drum, said vapour, say at a temperature of 100° C. being withdrawn through the connection $h^2$ and delivered by the compressor $h$, say at a temperature in the neighborhood of 105° C. into the interior of the drum through the connection $h'$.

The surface of the drum $f$ picks up a thin film or layer of the peat material from the trough $e$ which layer more or less adheres to the surface and is carried thereby until its water content has been reduced to a predetermined amount, say for example to 80% when the layer of material which will then assume a more or less plastic consistency is removed by suitable scraping devices $i$ and delivered to a trough $j$ from which it may be removed by suitable means, say a screw conveyor $k^4$ operating in the bottom of the trough.

The more or less plastic material withdrawn from the casing $g$ may be carried through a conduit $k'$ by means of a second screw conveyor $k^2$ capable of exerting sufficient pressure on the material to discharge it from a slot 4 in a conduit 5 on to the surface of a second drum $f'$ similar but if required of different dimensions to the first drum and working in a similarly enclosed casing $g'$.

The peat material is squeezed out in a thin layer so that it will adhere to the circumferential surface of the drum $f'$ by which it is carried round until its water content has been reduced by evaporation, say down to about 10% when the material is removed from the surface by scrapers $i'$ and removed from the chamber, say in the manner already described, or by any other suitable means.

The second drum $f'$ is heated in an exactly similar manner to the first, say by a compressor $h$ withdrawing the vapour through the pipe $h^2$ and delivering it at a slightly increased temperature into the interior of the drum $f'$ through the pipe $h'$.

For starting the apparatus the drums $f$ and $f'$ may be first heated by live steam or vapour of a suitable temperature from any convenient exterior supply, and means may be provided for making up for waste heat in any suitable manner as hereinbefore indicated. Any suitable devices may also be added for regenerating the heat of the condensate which is discharged from the drums and for preheating the material to be treated in any suitable manner, and in any case it is desirable that the material shall be heated sufficiently to drive off the air and fixed gases which it may contain before it is delivered into the drum chamber. Similar precautions for the removal or exclusion of air are also desirable in the passage of the partially dried material from one stage of the apparatus to the other.

As an instance of the economy in the size of apparatus which may be attained through working in two stages, peat pulp of 94% water content if dried upon the surface of only one drum might have its water evaporated at an average rate of 10 kilogrammes per square metre per hour, which for one ton per hour of raw peat treated would entail an evaporation of 933 kilogrammes of water, and the employment of a drum provided with $93\frac{1}{3}$ square metres of heating surface.

If the operation is performed upon two drums of which the first effects a reduction of water content from 94% to 80% and the second a reduction of from 80% to 10%, the first drum will have to evaporate 700 kilogrammes of water per hour, which could be accomplished at the rate of 30 kilograms per square metre per hour and would thus require a drum having only $23\frac{1}{3}$ square metres surface. The second drum would require to evaporate 233 kilogrammes per hour which might be effected at an evaporation of 8 kilogrammes per square metre surface per hour and thus require a drum having $29\frac{1}{8}$ square metres surface.

The total surface required for the two drums would therefore equal $52\frac{1}{2}$ square meters, which as compared with the $93\frac{1}{3}$ square metres surface required in a single drum, effects a saving of $40\frac{5}{6}$ square metres heating surface, or broadly speaking a reduction in heating surface of very nearly one-half.

In dividing the operation into two stages as hereinbefore described, it has been arranged in such a manner that the material in both stages is capable of adhering to the drum without any additional support, but for some materials and/or different division of the stages the material passing into the second stage may be of such a nature that it would not of itself adhere or stick to the heating surface.

Figure 2:
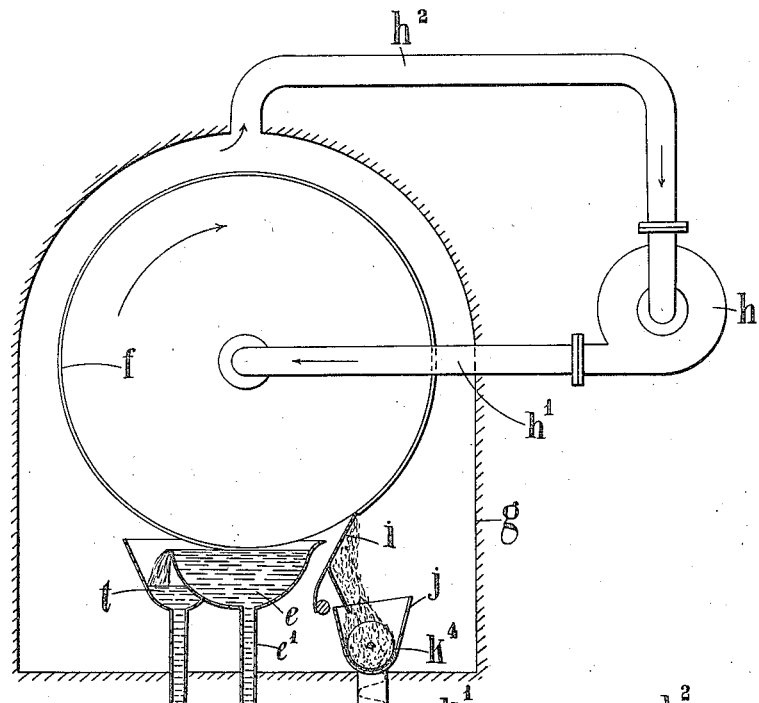
Figure 2 shows a way of carrying the invention into effect when using two rotating drums and material which will readily adhere to the surfaces in both stages.
Figure 2:
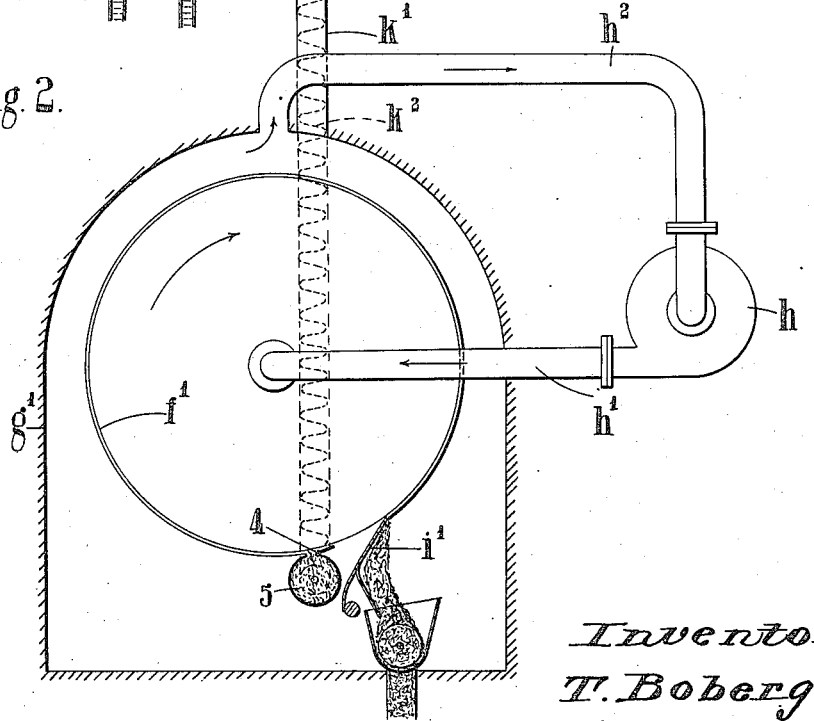

An arrangement for dealing with such conditions is shown in Figure 3, in which the apparatus for the first stage is similar to that already described for the first stage in Figure 2, but the material having reached a divided, powdered or like condition by the time it is removed by the scrapers $i$ is fed by a screw conveyor or other suitable means $k^3$ to a revolving perforated cylindrical pipe or cylinder 6 positioned in the casing $g^2$ of the second drum $f'$ and distributing the material upon a reticulate, perforated, sieve-like porous or like endless band conveyor 7 surrounding the greater portion of the periphery of the drum $f'$ and having an extended portion formed into a loop by the guide rollers 8 and 9.

The material is evenly distributed upon the band in a layer or film of the required thickness by the rotating cylinder 6 and is carried by the band into contact with the drying surface against which it is held while the surface, material and band move together through the greater portion of the circumference of the drum. The band leaves the surface of the drum to pass to the guide roller 8 and the released layer of material may then fall directly into the trough 10 or if necessary be removed by scrapers 11 adjacent to the side of the trough. The trough 10 may be fitted with a conveyor screw 12 or other convenient means for removing the material from the apparatus and both of the drums are heated by the vapour given off by the drying material after the temperature of the vapour has been raised sufficiently in its passage through the compressors $h, h$.

Instead of using a band as last described, powdery or like material removed from the drum casing may be as shown in Figure 4 fed into the top of an upright cylindrical vessel 11 fitted throughout its length with a series of superimposed horizontal hollow platforms or trays 12, each provided with a central aperture 13 to accommodate a shaft 14 rotating co-axially in the cylindrical vessel.

The platforms 12 in addition to the central aperture may also each be provided with a radial slot or series of apertures arranged in a radial direction, the slot or apertures of one platform being slightly in advance of those of the next platform below it and so on in the direction in which the shaft 14 is intended to rotate.

The rotating shaft 14 is provided with a series of arms 15 carrying brushes, scrapers or like distributing means 16. A pair or set of arms working over the surface of each of the platforms 12 and carrying the material deposited upon the said platform round until it falls through the slots or apertures on to the next. The material will be deposited by the cap 17 upon the top platform and after completing the circuit thereof will fall to the next, round which it is carried and so on until it reaches the bottom of the apparatus from whence it may be removed by any suitable conveyor or other means. The shaft 14 may be driven through suitable gearing 18, 19, from a shaft 20 supported in bearings 21 and passing through to the exterior of the casing where it is fitted with suitable driving pulleys 22.

The vapour given off from the drying material is collected by the compressor $h$ through the pipe $h^2$ and after compression to raise its temperature a small amount is delivered to the header 26 whence it passes to the interior of the hollow platforms 12 by means of the connections 23, the condensed liquid being removed from the platforms upon the opposite side or other suitable position by means of connections 24 running into a draining header 25, the heat of the liquid being re-utilized as desired.

In the illustrations given by way of example a separate compressor is shown for dealing with the vapour of each stage of the apparatus, and in some cases it may be desirable to adopt this arrangement and to work the two stages at different pressures. In other cases the vapor may be withdrawn from both units of a complete installation and delivered to the drying elements of said units in series, the vapour not condensed in the first passing on after further compression if desirable to the second, or any other suitable arrangement may be employed.

As an alternative to the endless band conveyor hereinbefore described, a band may be arranged to carry a layer of material into a closed casing in which a heating drum or other suitable heating surface is positioned, sealing means such as pressing rollers or the like being provided at the entry and exit of the band in order to form a tight joint. Such a band or carrier may be adapted either to press the material in actual contact with the heating surface or merely carry it around with the band itself in contact with the heating surface and the material adhering to its opposite side. In some cases it may be desirable for a band to carry the material over a stationary surface, but generally speaking it is preferable for the band and heating surface to move at substantially the same speed so that when once the material has reached the heating surface it remains in contact therewith until the desired degree of dryness has been attained.

By means of such bands or like appliances materials of a pulpy, granular or powdered or other form and having any water content up to or exceeding 50% may be satisfactorily treated, and the band may form a transmitting means for carrying the material from a previous or to a subsequent apparatus for other desired treatment.

The apparatus utilized may of course be varied to suit any particular requirement and the vessel or vessels may for example, be stationary and the material alternately poured on wet and removed dry.

In the examples described one or two stages only have been mentioned, but in some instances it may be desirable to introduce three or any other number of stages, the material passing from one to the other in any of the ways illustrated or described.

The area of the heating surfaces in any two or more stages together with the speed of application and removal of the material is adjusted to effect the desired amount of evaporation in each stage so as to complete the drying operation with apparatus of the most convenient size for the purpose in hand.

Although described in connection with the treatment of peat, it is to be understood that apparatus as hereinbefore described may be used for treating any other moist material which is to be dried, also that other forms of apparatus suitable for performing the required functions by means of the vapour compression evaporative method may be substituted for that hereinbefore described. Material of suitable water content may also be treated in any one or more types of apparatus most suitable for performing the particular operations which are required, and modifications and additions may also be introduced without in any way departing from the spirit of this invention.

The power utilized for driving the compressor is to a certain extent transferred into heat, which makes the process, once started, self-supporting as regards heat. The power required for the compressor and for the revolving of the vessel, etc., costs, expressed in calories, merely a fraction of what would be the cost if the drying were conducted by any other known method.

In view of the fact that in accordance with the present invention the latent heat of the evaporated liquid is utilized for evaporating a further quantity of the liquid the heat economy thereby established renders it possible, not only to facilitate and cheapen the drying of materials which are at present being dried by various methods, but it also opens out a new field and makes it possible to economically dry materials which at the present moment may be considered as waste. The drying surface required is generally speaking not greater than the drying surface required when the old methods are employed and the surface required is frequently considerably less. The drying may be regarded as practically self-supporting from a heat point of view. Instead of using large quantities of added heat a comparatively small number of calories are employed for power purposes.

Having now described my invention, what I claim as new and desire to secure by Letters Patent is:—

1. The method of vapourizing liquids consisting in moving a heat transmitting partition forming part of a closed vessel to spread thereon a thin film of material adapted to evolve steam or vapour and deposit solid matter, withdrawing and mechanically compressing said steam to raise its temperature and applying the steam as a heating medium to the opposite surface of said partition, and separately removing the water of condensation and the deposited matter.

2. A method of vapourizing liquid comprising moving a heat transmitting partition forming part of a closed vessel while applying a thin adhesive film from which liquid can be evaporated to the surface of said vessel, mechanically compressing steam evaporated from said film to raise its temperature, returning the steam to the reverse side of said partition to be condensed by parting with its latent heat and removing any matter deposited from said film from said moving surface.

3. The method of evaporating liquids which consists in supplying wet matter to a suitable casing, picking up the matter from the supply in the lower part of said casing on a moving exterior surface of a closed vessel having a heat conducting wall thus raising a thin film of the matter from the supply onto said heat conducting wall, exhausting the vapours from the casing, compressing them mechanically to raise their temperature and returning them to the interior of the moving vessel.

4. An evaporating apparatus for re-utilization of latent heat comprising a moving heat transmitting partition, means for applying to said partition an adhesive film of heated material, means for collecting the vapour given off by said heated material, and means for raising the temperature of said vapour by compression and returning it as the heating medium to the other side of said partition.

5. An apparatus for evaporating liquid from solid material by the re-utilization of latent heat, comprising a rotatable heat transmitting partition, means for applying a film of material onto the surface of said partition to cause it to adhere thereto, means for collecting the vapour given off by the said film of material, and means for raising the temperature of said vapour by compression and returning it as the heating medium to the other side of said partition.

6. Apparatus for drying material by the re-utilization of latent heat in a plurality of stages, comprising a plurality of moving heat transmitting partitions, means for applying to the first of said partitions liquid material, means for raising the temperature of the evolved vapour by mechanical compression and returning it to the other side of the first partition, and means for transferring successively the material thus deprived of a part of its liquid content to another succeeding similarly heated and suitably proportioned partition.

7. An apparatus for drying material by the re-utilization of latent heat, comprising in combination a closed chamber, a heated drum rotatable in said chamber, means for applying a thin layer of moist material to the surface of said drum, means for withdrawing the evolved vapour from said chamber, raising its temperature and returning it to the interior of said drum as the heating medium, means for evacuating from the bottom of said drum liquid resulting from the condensation of said vapour, and means for collecting the material from the drum surface after its liquid content has been reduced.

8. Apparatus for drying material by the re-utilization of latent heat, comprising in combination a drying drum, means for applying material to be dried to the surface of said drum, means for transferring the material after losing part of its liquid content to a second drum, means for collecting the vapour evolved from the drying surfaces, and means for compressing and thus raising the temperature of said vapour and returning it as the heating medium to the inside of said drying drums.

9. An apparatus for economizing heat in the drying of materials comprising in combination an enclosing chamber, a rotatable closed vessel in the form of a drum in said chamber, a mechanical compressor, a conduit connecting said chamber to the inlet of said compressor, a conduit connecting the discharge from said compressor to the interior of said drum, means for spreading a film of moist material on the exterior of said drum, means for evacuating from said drum liquid of condensation and imparting its heat to more material, and means for removing the material from which vapour has been evolved from the exterior of said drum.

In testimony whereof I have signed my name to this specification.

TEOFRON BOBERG.

Witnesses:
SAVILLE AUBREY BROOKE,
ELU PETTERNAU.